US 8,451,351 B2

(12) United States Patent
Kitani

(10) Patent No.: US 8,451,351 B2
(45) Date of Patent: May 28, 2013

(54) IMAGE PROCESSOR, METHOD OF CONTROLLING THE SAME, AND STORAGE MEDIUM

(75) Inventor: Kazunari Kitani, Yokohama (JP)

(73) Assignee: Canon Kabushiki Kaisha (JP)

( * ) Notice: Subject to any disclaimer, the term of this patent is extended or adjusted under 35 U.S.C. 154(b) by 32 days.

(21) Appl. No.: 13/282,569

(22) Filed: Oct. 27, 2011

(65) Prior Publication Data

US 2012/0105689 A1    May 3, 2012

(30) Foreign Application Priority Data

Oct. 28, 2010    (JP) .................................. 2010-242426

(51) Int. Cl.
*H04N 9/64* (2006.01)
(52) U.S. Cl.
USPC ......................................... 348/247; 348/246
(58) Field of Classification Search
USPC ............. 348/246, 247, 241, 221.1; 250/208.1
See application file for complete search history.

(56) References Cited

U.S. PATENT DOCUMENTS

| 7,301,572 B2* | 11/2007 | Kitani ........................... 348/247 |
| 7,433,547 B2* | 10/2008 | Yamamoto ..................... 382/309 |
| 2005/0078204 A1* | 4/2005 | Matsuoka et al. ............. 348/246 |
| 2006/0290794 A1* | 12/2006 | Bergman et al. .............. 348/246 |
| 2008/0297629 A1* | 12/2008 | Kitani ........................... 348/247 |
| 2011/0090381 A1* | 4/2011 | Cote et al. .................... 348/246 |

FOREIGN PATENT DOCUMENTS

JP    2001-326850 A    11/2001

* cited by examiner

*Primary Examiner* — Tuan Ho
*Assistant Examiner* — Zhenzhen Wu
(74) *Attorney, Agent, or Firm* — Rossi, Kimms & McDowell LLP

(57) ABSTRACT

An image processor which is capable of performing correction of defective pixels without degrading image quality when synthesizing a plurality of still images. When a plurality of image data items are synthesized, a first reference value which is smaller than a second reference value for use in determining whether or not to correct pixel data forming the image data is compared with a pixel value indicated by each of synthesized pixel data items forming the synthesized image data, and first correction processing is performed in which the synthesized pixel data of the synthesized image data is corrected according to a result of comparison.

15 Claims, 13 Drawing Sheets

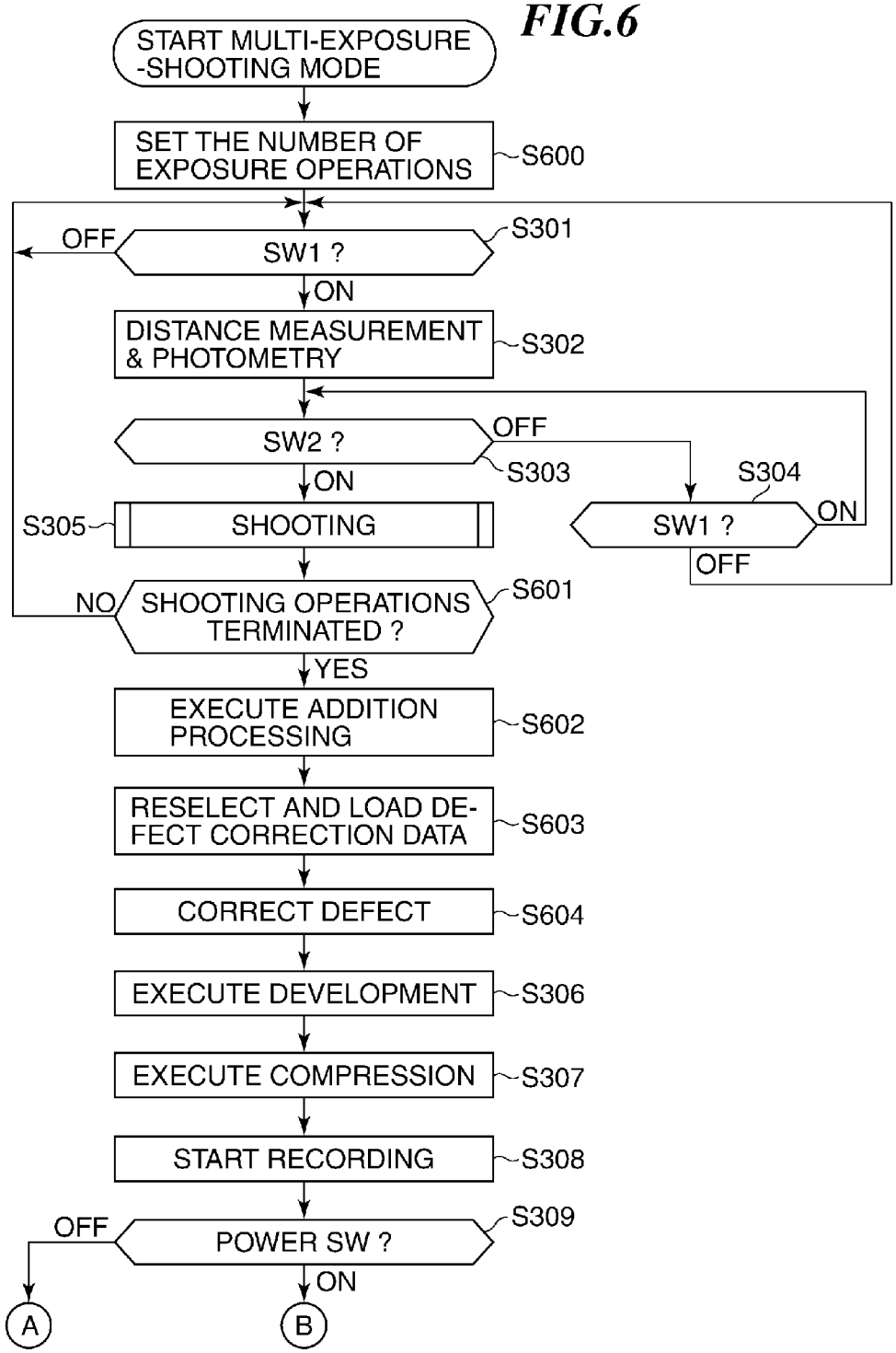

STILL IMAGE SHOOTING

AFTER DEFECT CORRECTION

MULTI-EXPOSURE SHOOTING
(3 EXPOSURE OPERATIONS)

CORRECTED AFTER SYNTHESIS PROCESSING

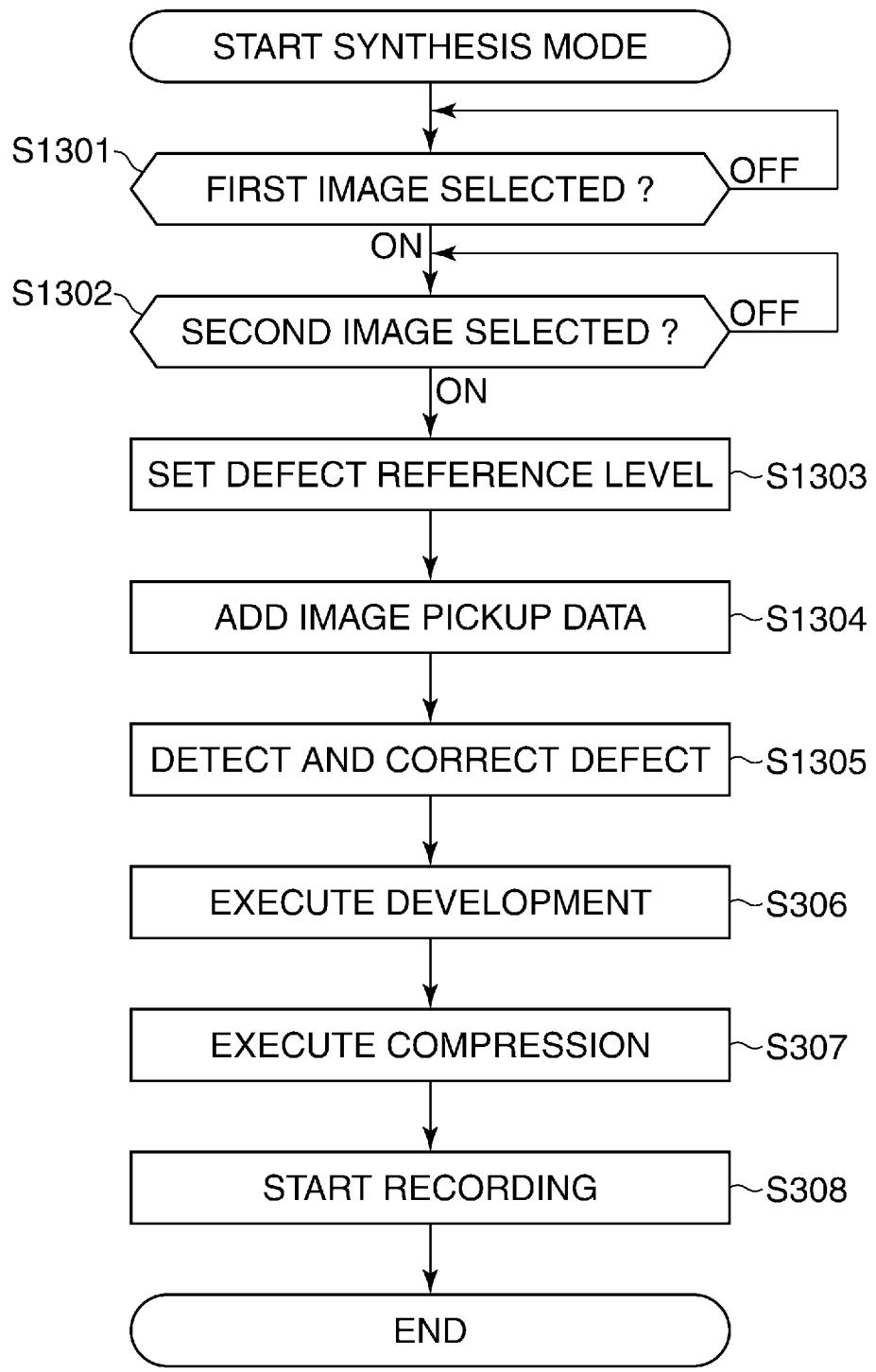

IMAGE PROCESSOR, METHOD OF CONTROLLING THE SAME, AND STORAGE MEDIUM

BACKGROUND OF THE INVENTION

1. Field of the Invention

The present invention relates to an image processor for reproducing a still image, a method of controlling the same, and a storage medium, and particularly to an image processor that performs correction of defective pixels when synthesizing a plurality of still images, a method of controlling the same, and a storage medium.

2. Description of the Related Art

In general, an image pickup apparatus for shooting, recording and reproducing a still image is equipped with an image processor, by which the synthesizing of a plurality of still images is sometimes performed. When a plurality of still images are synthesized, it is necessary to perform so-called defective pixel correction on defective pixels.

For example, in one exposure operation, an operation for reading out a video signal (image signal) from an image pickup device is performed a plurality of times to thereby record a plurality of video signals obtained by the reading operation. Further, when the plurality of video signals are subjected to synthesizing processing (e.g. addition processing) to thereby generate one video signal, the defective pixel correction is performed on each of the plurality of video signals (see e.g. Japanese Patent Laid-Open Publication No. 2001-326850).

However, in the method described in Japanese Patent Laid-Open Publication No. 2001-326850, although the defective pixel correction is performed on an individual video signal, a level is not indicated with reference to which some of image data items forming the video signal are determined as defective pixels. Therefore, for example, assuming that a minor defective pixel below the level exists in each image data item, when the plurality of image data items are accumulated by the addition processing, this causes accumulation of the defective pixel data items. As a result, this brings about a problem that even when the defective pixel correction is performed on each individual video signal, it is sometimes impossible to prevent degradation of image quality.

Further, it is known that along with an increase in the number of pixels and an increase in the sensitivity of an image pickup apparatus, such as a digital camera, an image pickup device, particularly a CMOS image sensor suffers from RTS (random telegraph signal) noise generated from transistors that read out pixels, which results in generation of white spot noise in an image.

This causes a problem that if a plurality of still images are synthesized in an image area in which such RST noise is generated, a large amount of white spot noise is generated within a screen, which degrades image quality.

SUMMARY OF THE INVENTION

The present invention provides an image processor which is capable of performing correction of defective pixels without degrading image quality when synthesizing a plurality of still images, a method of controlling the image processor, and a storage medium.

The present invention further provides an image processor which is capable of performing correction of defective pixels without degrading image quality even in synthesizing a plurality of still images obtained as results of shooting by an image pickup device that generates noise, such as RTS noise, in different locations varying from shot to shot, a method of controlling the image processor, and a storage medium.

In a first aspect of the present invention, there is provided an image processor that processes image data obtained as a result of image pickup by an image pickup device to form processed image data, comprising a synthesis unit configured to synthesize a plurality of image data items to form synthesized image data, a first comparison unit configured to compare a first reference value which is smaller than a second reference value for use in determining whether or not to correct each of pixel data items forming the image data, and a pixel value which is indicated by each of synthesized pixel data items forming the synthesized image data, and a first correction unit configured to perform first correction processing in which synthesized pixel data items of the synthesized image data are corrected according to a result of comparison by the first comparison unit to thereby form the processed image data.

In a second aspect of the present invention, there is provided a method for controlling an image processor that processes image data obtained as a result of image pickup by an image pickup device to form processed image data, comprising synthesizing a plurality of image data items to form synthesized image data, comparing a first reference value which is smaller than a second reference value for use in determining whether or not to correct each of pixel data items forming the image data, and a pixel value which is indicated by each of synthesized pixel data items forming the synthesized image data, and performing first correction processing in which synthesized pixel data items of the synthesized image data are corrected according to a result of comparison to thereby form the processed image data.

In a third aspect of the present invention, there is provided a non-transitory computer-readable storage medium storing a computer-executable program for causing a computer provided in the image processor to execute a method of controlling an image processor that processes image data obtained as a result of image pickup by an image pickup device to form processed image data, wherein the method comprises synthesizing a plurality of image data items to form synthesized image data, comparing a first reference value which is smaller than a second reference value for use in determining whether or not to correct each of pixel data items forming the image data, and a pixel value which is indicated by each of synthesized pixel data items forming the synthesized image data, and performing first correction processing in which synthesized pixel data items of the synthesized image data are corrected according to a result of comparison to thereby form the processed image data.

According to the present invention, in processing for synthesizing a plurality of still images, it is possible to perform correction of defective pixels without degrading image quality. Further, also in synthesizing a plurality of still images obtained as results of shooting by an image pickup device that generates noise, such as RTS noise, in different locations varying from shot to shot, it is possible to perform correction of defective pixels without degrading image quality.

Further features of the present invention will become apparent from the following description of exemplary embodiments with reference to the attached drawings.

BRIEF DESCRIPTION OF THE DRAWINGS

FIG. 6 is a flowchart of a multi-exposure shooting-mode shooting process in the startup and shooting process shown in FIG. 2.

FIGS. 7A to 7D are diagrams useful in explaining reselection and loading of defect correction data executed in the multi-exposure shooting-mode shooting process shown in FIG. 6, in which FIG. 7A illustrates a reference value used in still image shooting, FIG. 7B illustrates defect correction in still image shooting, FIG. 7C illustrates a reference value used in multi-exposure shooting, and FIG. 7D illustrates defect correction in multi-exposure shooting.

FIG. 14 is a flowchart of a synthesis-mode shooting process in the startup and shooting process shown in FIG. 13.

DESCRIPTION OF THE EMBODIMENTS

The present invention will now be described in detail below with reference to the accompanying drawings showing embodiments thereof.

Figure 1:
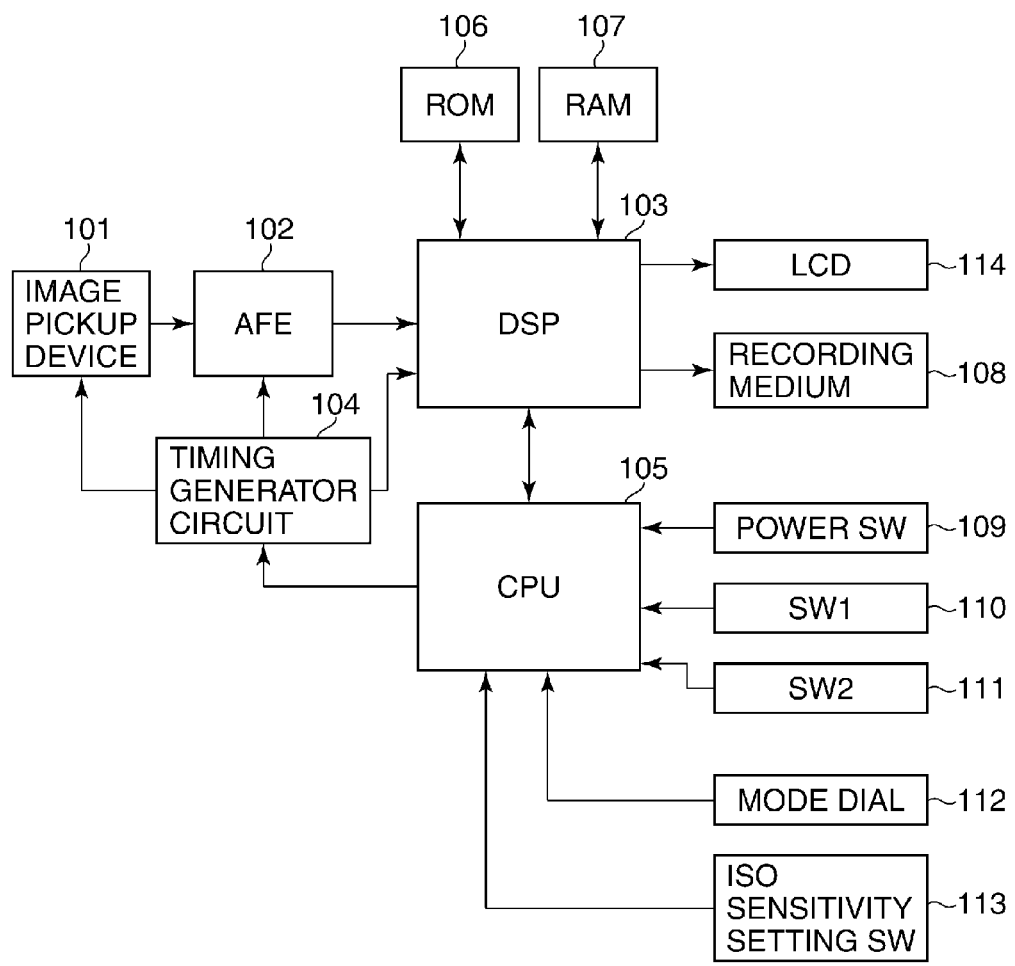
FIG. 1 is a block diagram of an image pickup apparatus including an image processor according to a first embodiment of the present invention.

FIG. 1 is a block diagram of an image pickup apparatus including an image processor according to a first embodiment of the present invention.

Referring to FIG. 1, the illustrated image pickup apparatus includes an image pickup device 101, an AFE (analog front end) 102, a DSP (digital signal processor) 103, a timing generator circuit 104, and a CPU 105. In the illustrated example, a CMOS sensor (solid-state image pickup device) is used for the image pickup device 101. This CMOS sensor incorporates an amplifier circuit (not shown) which switches the gain according to ISO sensitivity.

The AFE 102 includes an analog-to-digital converter (not shown) which converts an analog image signal (also referred to as the video signal) output from the image pickup device 101 to a digital image signal. Further, in the illustrated example, the AFE 102 has a function of clamping a dark offset level.

The DSP 103 performs various types of correction processing, development processing, and compression processing, on the digital image signal (also referred to as the image data) output from the AFE 102. Further, the DSP 103 performs processing for accessing various memories, such as a ROM (storage unit) 106 and a RAM 107. Further, the DSP 103 performs processing for writing image data (processed image data) into a recording medium 108, and performs processing for displaying various data items on a LCD (liquid crystal display) 114.

Note that the DSP 103 can perform various types of correction processing also on image data recorded in the RAM 107.

The DSP 103 includes a defect correction circuit, referred to hereinafter, which corrects output data of a defective pixel (i.e. a defective pixel data item) using output data of surrounding pixels around the defective pixel (i.e. pixel data items). That is, the defective pixel data item is corrected with the surrounding pixel data items.

Note that the ROM 106 stores defect correction data for a still image-shooting mode in advance, which was prepared when the image pickup apparatus or the image pickup device 101 was manufactured.

The timing generator circuit 104 supplies a clock signal and a control signal to the image pickup device 101, the AFE 102, and the DSP 103 under the control of the CPU 105. Further, the timing generator circuit 104 generates a timing signal according to various reading modes of the image pickup device (CMOS sensor) 101 in cooperation with the DSP 103.

The CPU 105 controls the DSP 103 and the timing generator circuit 104, and controls camera functions, such as photometry and distance measurement (ranging). In the illustrated example, a power switch 109, a first-stage shutter switch (SW1) 110, a second-stage shutter switch (SW2) 111, a mode dial 112, and an ISO sensitivity-setting switch 113 are connected to the CPU 105. The CPU 105 executes processing according to the settings of these switches and dial.

The ROM 106 stores a control program for the image pickup apparatus, i.e. a program executed by the CPU 105, various types of correction data (including the above-mentioned defect correction data), and so forth. For example, a flash memory is used for the ROM 106.

Further, the RAM 107 is used as a work area for temporarily storing image data and the like processed by the DSP 103. Note that the defect correction data stored in the ROM 106 is loaded into the RAM 107 when shooting.

Further, e.g. a memory card is used for the recording medium 108 which stores shot image data. The recording medium 108 is connected to the DSP 103 e.g. via a connector (not shown).

The power switch 109 is operated by the user when the image pickup apparatus is started. When the shutter switch 110 is turned on, the CPU 105 executes pre-shooting processing, such as photometry processing and distance measurement processing. Then, when the shutter switch 111 is turned on, a sequence of shooting operations are started under the control of the CPU 105, in which a mirror and a shutter (neither of which is shown) are driven, and an image signal output from the image pickup device 101 is written into the recording medium 108 as image data via the AFE 102 and the DSP 103.

The mode dial 112 is used for setting various kinds of operation modes of the image pickup apparatus. Further, the ISO sensitivity-setting switch 113 is used for setting the shooting ISO sensitivity of the image pickup apparatus. On the LCD 114, there are displayed various types of information associated with the image pickup apparatus. Further, images obtained as a result of shooting are reproduced and displayed on the LCD 114 (moving images are also displayed on the LCD 114).

Figure 2:
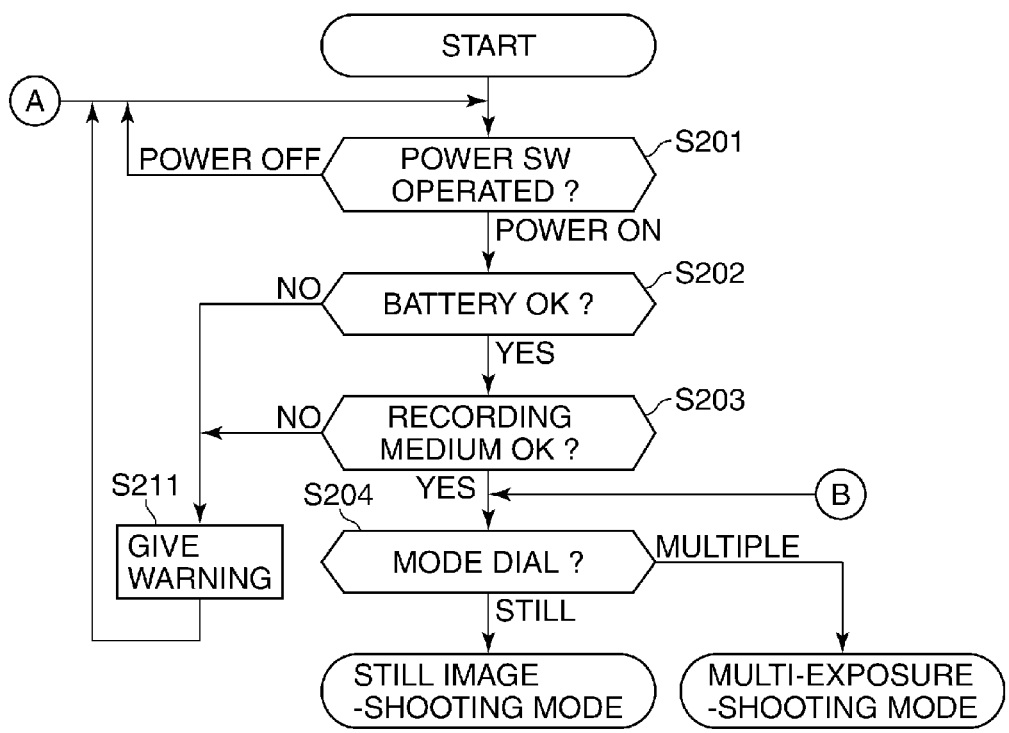
FIG. 2 is a flowchart of a startup and shooting process executed by the image pickup apparatus shown in FIG. 1.

FIG. 2 is a flowchart of a startup and shooting process executed by the image pickup apparatus shown in FIG. 1.

Referring to FIGS. 1 and 2, the CPU 105 monitors whether or not the power switch 109 is turned on (step S201). If the power switch 109 is not turned on (power OFF in the step S201), the CPU 105 waits. If the power switch 109 is turned on (power ON in the step S201), the CPU 105 determines whether or not an amount of electrical energy required for shooting remains in a battery (not shown) (step S202).

If the amount of electrical energy required for shooting does not remain in the battery (NO to the step S202), the CPU 105 displays a warning message to this effect on the LCD 114 (step S211), and returns to the step S201.

On the other hand, if the amount of electrical energy required for shooting remains in the battery (YES to the step S202), the CPU 105 checks the recording medium 108 (step S203). In this check, the CPU 105 determines whether or not the recoding medium 108 mounted on the image pickup apparatus is capable of recording image data in an amount not smaller than a predetermined volume.

If the recoding medium 108 is not capable of recording image data in the amount not smaller than the predetermined volume (NO to the step S203), the CPU 105 displays a warning message to this effect on the LCD 114 (step S211), and returns to the step S201.

If the recoding medium 108 is capable of recording image data in the amount not smaller than the predetermined volume (YES to the step S203), the CPU 105 determines which of shooting modes is set by the mode dial 112, a still image-shooting mode or a multi-exposure-shooting mode (step S204).

If the still image-shooting mode is set ("still" in the step S204), the CPU 105 shifts the shooting mode to the still image-shooting mode. If the multi-exposure-shooting mode is set ("multiple" in the step S204), the CPU 105 shifts the shooting mode to the multi-exposure-shooting mode.

Figure 3:
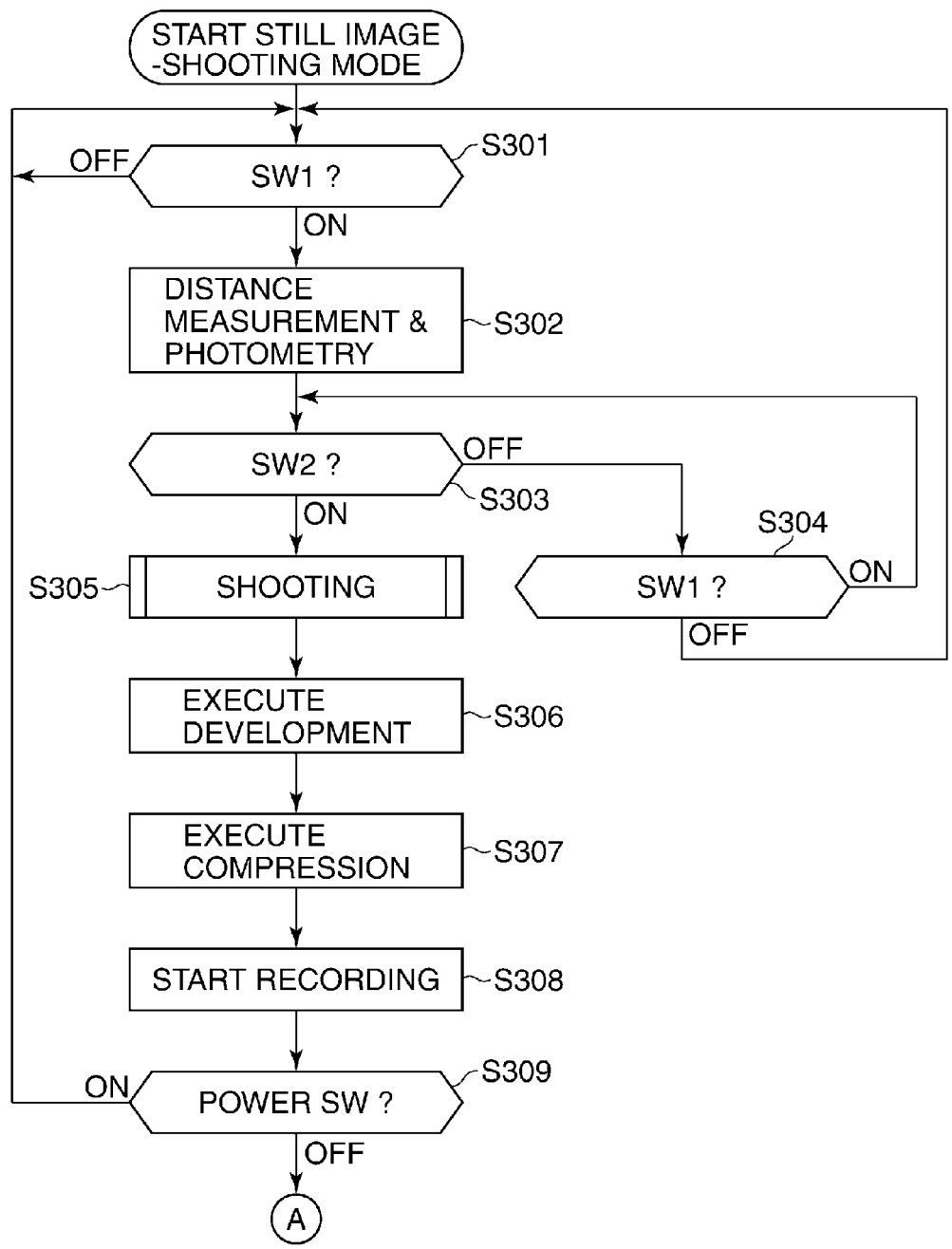
FIG. 3 is a flowchart of a still image-shooting-mode shooting process in the startup and shooting process shown in FIG. 2.

FIG. 3 is a flowchart of a still image-shooting-mode shooting process in the startup and shooting process shown in FIG. 2.

Referring to FIGS. 1 and 3, when the shooting mode is shifted to the still image-shooting mode, the CPU 105 first monitors whether or not the shutter switch 110 is turned on (step S301). If the shutter switch 110 is not turned on (OFF in the step S301), the CPU 105 waits.

On the other hand, if the shutter switch 110 is turned on (ON in the step S301), the CPU 105 performs photometry processing for determining an aperture value and a shutter speed and distance measurement processing for focusing a shooting lens on an object, by a photometry controller and a distance measurement controller (neither of which is shown), respectively (step S302).

Then, the CPU 105 determines whether or not the shutter switch 111 is turned on (step S303). If the shutter switch 111 is not turned on (OFF in the step S303), the CPU 105 determines whether or not the shutter switch 110 is on (step S304).

If the shutter switch 110 continues to be on (ON in the step S304), the CPU 105 returns to the step S303 to determine whether or not the shutter switch 111 is turned on.

On the other hand, if the shutter switch 110 does not continue to be on (OFF in the step S304), the CPU 105 returns to the step S301, and waits for the shutter switch 110 to be turned on again.

In the step S303, if it is determined that the shutter switch 111 is turned on (ON in the step S303), the CPU 105 executes a shooting process (step S305). The shooting process will be described hereinafter.

Next, the CPU 105 controls the DSP 103 to execute processing for developing image data obtained as a result of shooting (step S306). Then, the CPU 105 controls the DSP 103 to execute processing for compressing the image data having been subjected to the development processing, and stores the image data having been subjected to the compression processing in a vacant area of the RAM 107 (step S307).

Then, the CPU 105 controls the DSP 103 to read out the image data stored in the RAM 107, and records the read image data in the recording medium 108 (step S308). Then, the CPU 105 checks whether the power switch 109 is on or off (step S309).

If the power switch 109 is on (ON in the step S309), the CPU 105 returns to the step S301, and is on standby for next shooting. On the other hand, if the power switch 109 is turned off (OFF in the step S309), the CPU 105 returns to the step S201 in FIG. 2, and waits for the power switch to be turned on again.

Figure 4:
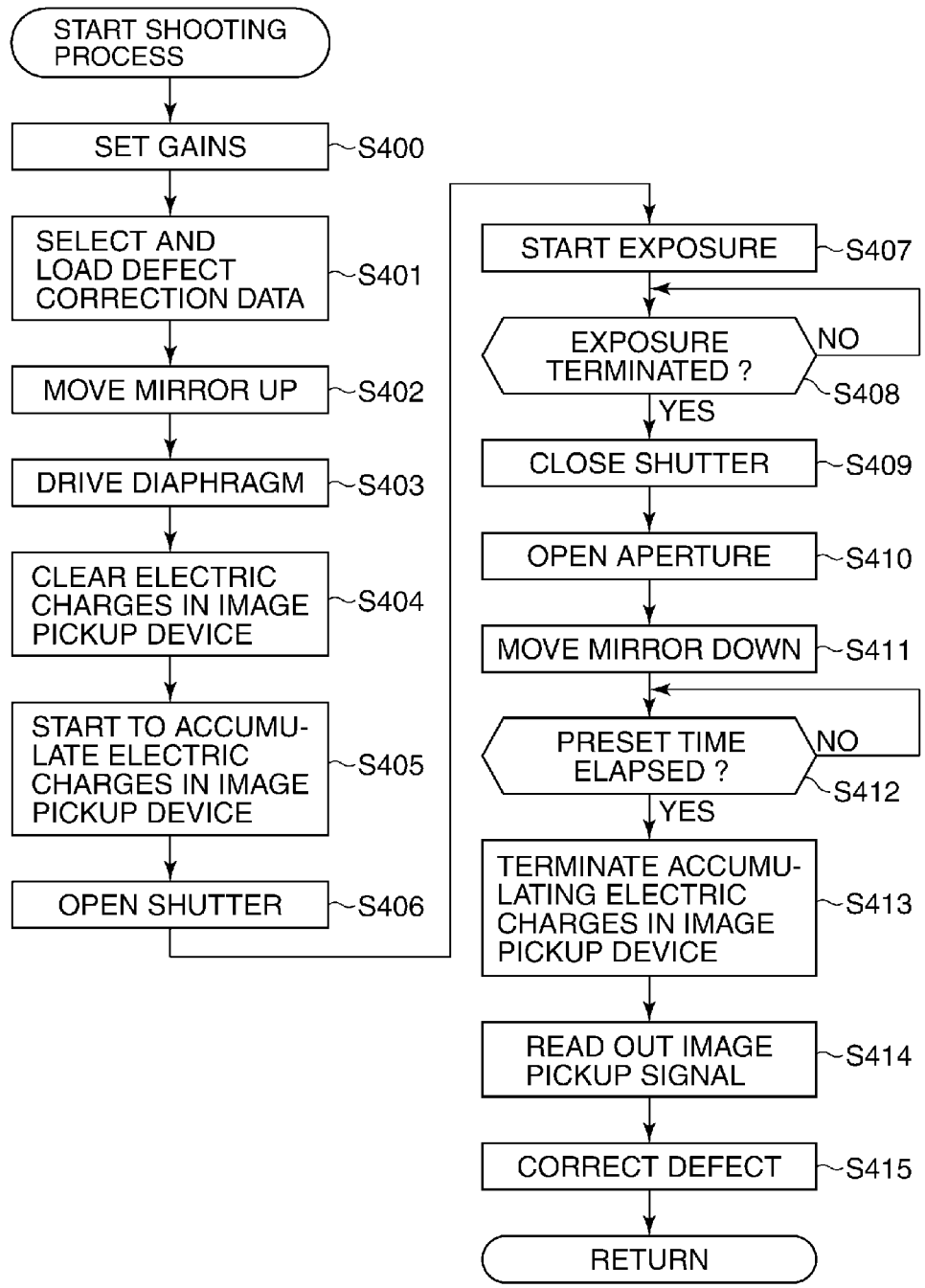
FIG. 4 is a flowchart of a shooting process in the still image-shooting-mode shooting process shown in FIG. 3.

FIG. 4 is a flowchart of the shooting process in the still image-shooting-mode shooting process shown in FIG. 3.

Referring to FIGS. 1 and 4, when the shooting process is started, the CPU 105 sets an amplification gain of the image pickup device 101 and a gain of the AFE 102, such that the shooting ISO sensitivity of the image pickup apparatus becomes equal to the ISO sensitivity set by the ISO sensitivity-setting switch 113 (step S400).

Next, the CPU 105 selects data for defect correction (step S401). Defect data associated with pixels is obtained e.g. by evaluating dark output and exposure output under predetermined conditions before shipping the image pickup device 101 from a manufacturing plant. This defect data defines pixels having output values exceeding a predetermined output range as defective pixels.

Further, the ROM 107 stores, as the defect correction data, data which is prepared based on the defect data, and is indicative of a type of each defective pixel (white defect, black defect, etc.), address information (a coordinate x in a horizontal direction and a coordinate y in a vertical direction on an image) of the defective pixel, and an output level of the defect pixel. In the following description, a description will be given of a case where the type of defective pixels to be corrected is white defect.

The white defect has characteristics that the level thereof (data level) becomes higher according to an exposure time (electric charge accumulation time). Even with the same level of white defect, if the ISO sensitivity is set to be higher, the white defect appears on the image as a larger defect.

To cope with this, in the illustrated example, as a reference value (second reference value) for use in determining whether or not a pixel of the image pickup device 101 is a defective pixel to be corrected, there is selected a reference value by which defective pixels at a smaller-size level in the defect correction data can be corrected (a larger number of defective pixels can be corrected) as the ISO sensitivity is higher and as shutter time is longer.

That is, in the step S401, the CPU 105 determines the reference value (second reference value) for determining defective pixels based on the ISO sensitivity set by the ISO sensitivity-setting switch 113 and the shutter speed determined in the step S302 in FIG. 3. Then, the CPU 105 compares a level value (pixel value) of each defect pixel of the defect correction data stored in the ROM 106 with this reference value, and obtains comparison results.

Then, the CPU 105 selects from defective pixels indicated by the defect correction data according to the comparison results, only pixels the level values of which exceed the reference value, as defective pixels to be corrected. Then, the CPU 105 loads the defect correction data associated with the defective pixels to be corrected into the RAM 107.

At this time, the defect correction data loaded in the RAM 107 includes only address information of the defective pixels to be corrected (also simply referred to as the correction target pixel). That is, pixels of which address information exists in the RAM 107 are correction target pixels.

Next, the CPU 105 moves the mirror to a mirror up position (step S402). Then, the CPU 105 drives the diaphragm to a predetermined aperture value based on the photometry data obtained in the photometry processing in the step S302 shown in FIG. 3 (step S403).

The CPU 105 deletes (clears) the electric charges in the image pickup device 101 (step S404). Thereafter, the CPU 105 starts to accumulate electric charges in the image pickup device 101 (step S405). Then, the CPU 105 opens the shutter (step S406), and starts exposure of the image pickup device 101 (step S407).

The CPU 105 determines whether or not an exposure time which is set according to the photometry data has elapsed (step S408). If the exposure time has not elapsed (NO to the step S408), the CPU 105 waits. On the other hand, if the exposure time has elapsed (YES to the step S408), the CPU 105 closes the shutter (step S409).

Next, the CPU 105 drives the diaphragm to an open aperture value (step S410). Then, the CPU 105 starts driving the mirror so as to cause the same to move to a mirror down position (step S411). Thereafter, the CPU 105 determines whether or not an electric charge accumulation time (preset time) set in advance has elapsed (step S412). If the electric charge accumulation time has not elapsed (NO to the step S412), the CPU 105 waits.

On the other hand, if the electric charge accumulation time has elapsed (YES to the step S412), the CPU 105 terminates accumulating electric charges in the image pickup device 101 (step S413). Next, the CPU 105 reads out an image signal from the image pickup device 101 (step S414). In this case, the AFE 102 having the function of clamping the dark offset level performs a clamp operation using an output from an optical black section (not shown) of the image pickup device 101.

Next, the DSP 103 performs defect correction processing (second correction processing) (step S415) under the control of the CPU 105. This defect correction processing is executed by a defect correction circuit, referred to hereinafter. Note that the defect correction circuit is included in the DSP 103 appearing in FIG. 1.

The defect correction circuit replaces data associated with each defective pixel (also referred to as defective pixel data) in pixel-associated data (also referred to as pixel data) input from the AFE 102, by the pixel data of the same color immediately before the defective pixel data, and outputs the resulting data.

Figure 5:
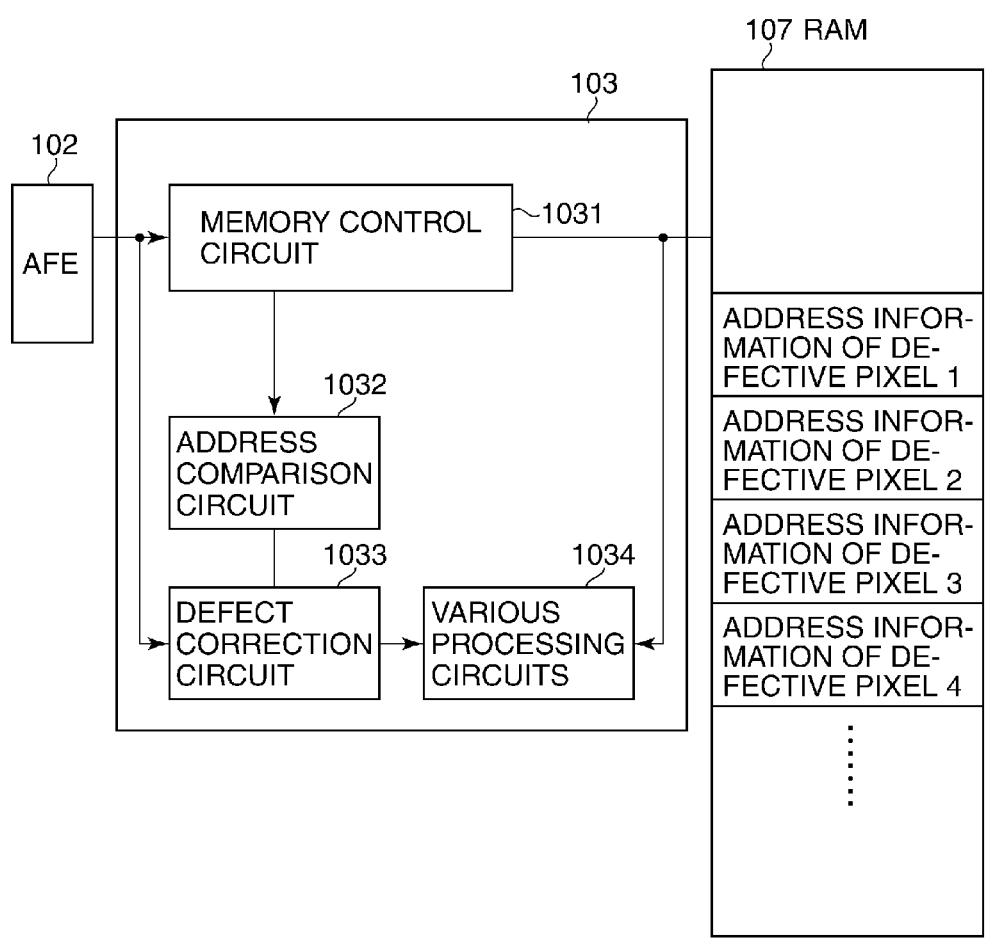
FIG. 5 is a block diagram of a DSP of the image pickup apparatus shown in FIG. 1, including the image processor according to the first embodiment.

FIG. 5 is a block diagram of the DSP 103, appearing in FIG. 1.

Referring to FIGS. 1 and 5, the DSP 103 includes a memory control circuit 1031, an address comparison circuit 1032, a defect correction circuit 1033, and various processing circuits 1034. As described above, the CPU 105 loads the address information of defective pixels which are to be corrected (correction target pixel) in the RAM 107.

The defect correction circuit 1033 performs correction processing based on the address information of the correction target pixels loaded in the RAM 107. Note that the address information associated with the correction target pixels is loaded after converting the same to timing data in which timing of appearance of each defective pixel is determined with reference to a synchronization signal.

The memory control circuit 1031 sequentially transfers the timing data as the address information of the correction target pixels (e.g. the defective pixels "1" to "4") from the RAM 107 to the address comparison circuit 1032. The address comparison circuit 1032 compares the read timing of the image pickup device 101 determined with reference to the synchronization signal, with each pixel-associated timing data item of the timing data. Then, if the read timing and a pixel-associated timing data item match each other, the defect correction circuit 1033 replaces the pixel data by pixel data of the same color immediately before the defective pixel data and outputs the same.

Thereafter, to prepare for correcting a next defective pixel (correction target pixel), timing data as the address information of the next defective pixel is immediately transferred from the memory control circuit 1031 to the address comparison circuit 1032. Then, the correction of the pixel data associated with the defective pixel is similarly performed by the defect correction circuit 1033.

The various processing circuits, collectively denoted by the reference numeral 1034, performs various kinds of processing operations such as development processing, compression processing, and record processing in the steps S306 to S308 descried with reference to FIG. 3, on the image data which has been subjected to the above-mentioned defect correction processing.

FIG. 6 is a flowchart of a multi-exposure shooting-mode shooting process in the startup and shooting process shown in FIG. 2. Note that the same steps in FIG. 6 as in FIG. 3 are denoted by the same reference numerals, and description thereof is omitted.

When the shooting mode is shifted to the multi-exposure-shooting mode, the CPU 105 performs setting of how many frames of images are superposed. That is, the CPU 105 sets the number of exposure operations (step S600). The setting of the number of exposure operations is performed on a screen displayed on the LCD 14, by the user using an operation switch (not shown).

Next, the CPU 105 executes the steps S301 to S305 described with reference to FIG. 3. Note that although the shooting process executed in the step S305 has been described with reference to FIG. 4, in the multi-exposure-shooting mode, the corrected image data is stored in the RAM 107 without executing the development processing on the corrected image data.

Next, the CPU 105 determines whether or not the shooting processes corresponding to the number of exposure operations have been completed (step S601). If the shooting processes do not reach the number of exposure operations (NO to the step S601), the CPU 105 returns to the step S301, and waits for the shutter switch 110 to be operated again.

On the other hand, if the shooting processes have reached the number of exposure operations (YES to the step S601), the CPU 105 performs addition processing (synthesis processing) on image data items corresponding to the number of exposure operations (step S602). In the illustrated example, the addition processing is simply performed at the same gain.

If the dark offset level of the image data is other than an OLSB (optimal least-signification-bit), the image data is shifted by an amount corresponding to the dark offset level whenever the addition processing is performed, and hence only correction of the dark offset level is performed. For example, when addition processing is performed on two image data items stored in the RAM 107, (added image data)=(first image data item)+(second image data item)−(dark offset level) is calculated for each corresponding pixels of the two image data items. Then, the processing is repeated a number of times corresponding to the number of exposure operations. The image data of each frame can be overwritten, because the image data having been subjected to the addition processing is no longer needed.

According to the above-mentioned processing, even when the multi-exposure shooting is performed, it is possible to accurately add image data without changing the dark offset level. The image data obtained by performing the addition processing a number of times associated with the number of exposure operations (hereinafter referred to as the synthesized image data) is recorded in the RAM 107.

Next, the CPU 105 selects and loads the defect correction data again for the synthesized image data (step S603). In the multi-exposure shooting, even a white defect which is at a minute-size level and is hardly visually noticed in each shot frame sometimes comes to be noticed as an apparent or clear white defect after a plurality of frames each including the white defect are added together.

Therefore, in this process, in place of the reference value selected in association with the ISO sensitivity and the shutter second in shooting of each frame, there is used a reference value (first reference value) by which even a defective pixel at a minute-size level can be corrected. Then, as described in the step S401 in FIG. 4, the defect correction data is loaded into the RAM 107.

Figure 7A:
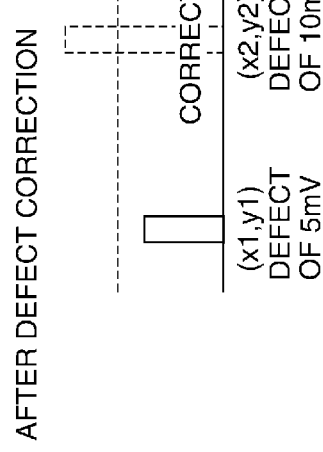
Figure 7B:
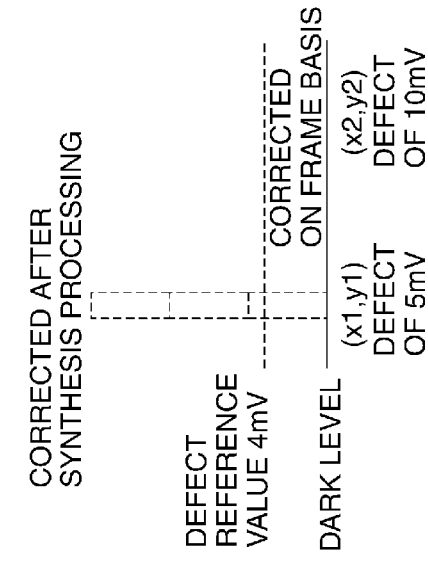
Figure 7C:
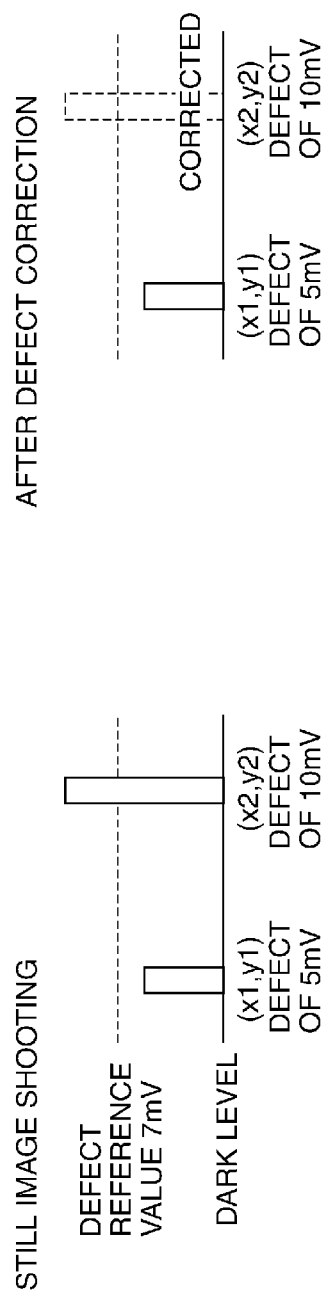
Figure 7D:
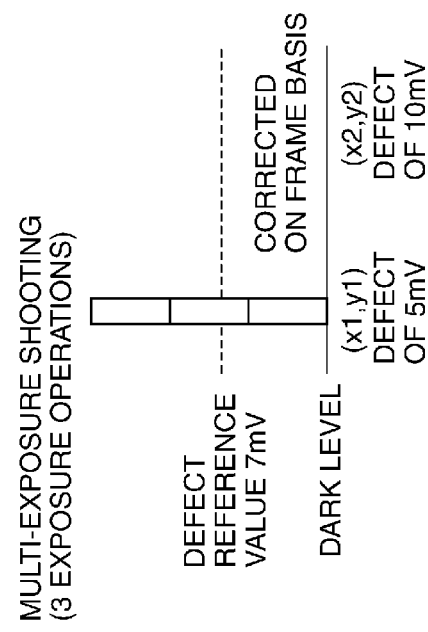

FIGS. 7A to 7D are diagrams useful in explaining reselection and loading of the defect correction data (step S603) shown in FIG. 6. FIG. 7A illustrates the reference value used in still image shooting, and FIG. 7B illustrates defect correction in still image shooting. Further, FIG. 7C illustrates the reference value used in multi-exposure shooting, and FIG. 7D illustrates defect correction in multi-exposure shooting.

Referring to FIGS. 7A to 7D, to simplify the explanation, a description will be given of a case where a dark image is shot. In the illustrated example, it is assumed that three exposure operations have been performed in the multi-exposure shooting.

In FIG. 7A, now, it is assumed that a defective pixel indicated by "5 mV" in the defect correction data exists at the coordinates (x1, y1), and similarly, a defective pixel indicated by "10 mV" in the defect correction data exists at the coordinates (x2, y2). In this case, let it be assumed that the reference value (second reference value) indicated by "7 mV" is selected as a reference value when the image has been shot at a certain ISO sensitivity and a certain exposure time in still image shooting.

When the defect correction processing is performed according to the above-mentioned reference value, as shown in FIG. 7B, the defective pixel at the coordinates (x1, y1) which is not larger than the reference value "7 mV" is not to be corrected. On the other hand, the correction processing is performed on the defective pixel at the coordinates (x2, y2) which is larger than the reference value "7 mV", and after the defective pixel is corrected to have no difference from the other dark level, the development processing is performed.

In this case, although the pixel at the coordinates (x1, y1) is a defective pixel, it is judged that it is not noticeable as the image.

As shown in FIG. 7C, when the multi-exposure shooting having three exposure operations is performed, since the defective pixel at the coordinates (x2, y2) is subjected to the defect correction processing in shooting each frame, the defective pixel has been corrected when the addition processing (synthesis) is performed. Accordingly, since there is no difference from the output in the vicinity of the other dark level, even after the addition processing is performed, the defective pixel has no difference from pixels of the output in the vicinity of the other dark level.

On the other hand, the defective pixel at the coordinates (x1, y1) which is not noticeable in one shot image (i.e. synthesized pixel data) has its pixel value increased three times after the addition processing, and hence becomes noticeable as a defective pixel after the addition processing, as shown in FIG. 7D.

Therefore, if the level of the reference value (first reference value) associated with the defective pixel is reduced e.g. to "4 mV" after the addition processing, the defective pixel at the coordinates (x1, y1) also becomes a correction target pixel. In view of this, the correction of the defective pixel is performed in the image having been subjected to the addition processing.

Referring again to FIGS. 1 and 6, the DSP 103 performs the defect correction processing (first correction processing) on the image data (synthesized image data) obtained by the multi-exposure shooting, stored in the RAM 107, according to the defect correction data loaded in the RAM 107, and outputs the corrected image data to the RAM 107 again (step S604). The step S604 is the same as the step S415 described with reference to FIG. 4.

Thereafter, the CPU 105 executes the steps S306 to S309 described with reference to FIG. 3. Then, in the step S309, if the power switch 109 is turned on, the CPU 105 returns to the step S204 shown in FIG. 2 to confirm the setting of the mode dial. On the other hand, if the power switch 109 is switched off, the CPU 105 returns to the step S201 shown in FIG. 2, and waits for the power switch 109 to be turned on.

By the way, to set the defect level, there may be envisaged various kinds of methods therefor, but in general, when n frames of image data (n is an integer more than one) are subjected to the addition processing, by reducing the defect level to 1/n times of the reference value in the still image shooting under the same conditions, it is possible to perform the same defect correction processing as that in the still image shooting.

However, if the level of the reference value is reduced to 1/n, the number of correction target pixels sometimes becomes very large. For this reason, it is necessary to determine the setting of the level of the reference value while taking into account the processing capability of the CPU 105 and other related components.

Further, in the multi-exposure shooting, since the defect correction processing is performed after the addition processing, it is not necessarily required to perform the defect correction processing on a frame basis during the multi-exposure shooting. For example, while totally omitting frame-basis defect correction processing during the multi-exposure shooting, the correction processing may be performed on all of the defective pixels which are not lower than the 1/n level, after executing the addition processing.

Alternatively, the defect correction processing may be configured such that frame-basis correction is performed on all of defects not lower than the 1/n level, which is the reference value to be applied after the addition processing, and the defect correction is not performed after the addition processing.

In the frame-basis correction processing, defective pixels are corrected using the reference value at the same level as that in the still image shooting (still image reference level). Then, after the addition processing, the correction processing may be performed again by selecting defective pixels which are at defective levels between the 1/n level to the still image reference level, from the defect correction data, whereby the correction processing may be dispersed.

Although in the above-described example, when the processing for correcting a defective pixel is performed, the defective pixel is replaced by pixel data of the same color immediately before the defective pixel, any other correction method may be applied. Further, although in the illustrated example, the multi-exposure-shooting mode is selected using the mode dial, the mode may be switched using any other suitable method.

As described above, according to the first embodiment, it is possible to properly perform processing for correcting defective pixel data in the synthesized image data obtained by performing multi-exposure shooting and synthesizing the image data, and as a result, it is possible to prevent image quality of the synthesized image data from being degraded.

Next, a description will be given of an example of an image pickup apparatus equipped with an image processor according to a second embodiment of the present invention.

The image pickup apparatus according to the first embodiment is described as to the case where defective pixels to be corrected after the addition processing are white defects similar to those in the still image shooting. However, there is the problem of RTS noise, which is a defect affecting a finally obtained image differently between still image shooting and multi-exposure shooting due to the characteristics of RTS noise.

Along with miniaturization of pixels in recent years, RTS noise comes to be generated by transistors of the CMOS image sensor for reading specific pixels. RTS noise sometimes generates white point defects at specific pixels of image data.

RTS noise does not have clear temperature dependence and accumulation time dependence, so that it is difficult to correct the defect during the still image shooting. On the other hand, during the multi-exposure shooting, if RTS noise is generated in the same pixel in a plurality of shots, this produces the same result as that in the case where usual white defects are added.

Further, although an output corresponding to one generation of RTS noise is minute, in the high ISO sensitivity shooting, even when RTS noise is generated once in each of the plurality of pixels, if a lot of exposure operations are performed, minute defects come to occur all over the resulting data. As a result, even if individual bright points (defects) are not noticeable, degradation of image quality as a whole is inevitable.

Although RTS noise is randomly generated in specific pixels in each shooting operation, if a plurality of image data items are acquired in the testing before shipment, it is possible to identify pixels where RTS noise is generated, to some extent.

In the present embodiment, since RTS noise has pixel dependence, pixels where RTS noise is generated are corrected as one type of defective pixels, and the defect correction data including information, such as the type of RTS noise, a level, and addresses of each pixel, is also used for the multi-exposure shooting in addition to the white defect data used in the first embodiment.

The image pickup apparatus in the second embodiment has the same configuration as the image pickup apparatus shown in FIG. 1, and description of the same operations as those described in the first embodiment is omitted.

In still image shooting, when the defect correction data is selected in the step S401 shown in FIG. 4, the CPU 105 set white defects as correction targets, but does not set RTS noise as correction targets, similarly to the first embodiment.

On the other hand, in multi-exposure shooting, when the defect correction data is selected again in the step S603 in FIG. 6, the CPU 105 sets the low-level reference value (first reference value) for white defects, and adds RTS noise to targets to be corrected.

That is, the CPU 105 selects only defective pixels the level values of which exceed the reference value (first reference value) and defective pixels classified as pixels where RTS noise is generated, as defective pixels to be corrected, from defective pixels indicated by the defect correction data, and loads the address information of the defective pixels to be corrected into the RAM 107.

Next, the CPU 105 controls the DSP 103 to perform the correction processing in the step S604 in FIG. 6. As described above, in multi-exposure shooting, the correction processing is also performed on the defective pixels classified as RTS noise, and hence by eliminating the adverse influence of RTS noise, it is possible to obtain a high-quality image.

Note that as described in the first embodiment, the correction processing associated with RTS noise may be performed on a frame basis in multi-exposure shooting.

As described above, in the second embodiment, by eliminating the adverse influence of RTS noise in the synthesized image data, i.e. by positively correcting the defective pixel data due to RTS noise, it is possible to prevent image quality of the synthesized image data from being degraded.

Next, a description will be given of an image pickup apparatus using an image processor according to a third embodiment of the present invention.

In the above-described first and second embodiments, information on defective pixels to be corrected (i.e. defect correction data) is obtained by performing measurement in advance before shipment of the image pickup device. However, it requires time to acquire the defect correction data, resulting in increased costs of testing the image pickup device. To eliminate this problem, in the present embodiment, unusual pixel data to be corrected is extracted from image data obtained as a result of shooting, and is corrected.

In the present embodiment, a description will be given of the image pickup apparatus which extracts and corrects defective pixels to be corrected according to image data obtained as a result of shooting. The image pickup apparatus in the third embodiment has substantially the same configuration as the image pickup apparatus shown in FIG. 1, but is different from the image pickup apparatus shown in FIG. 1 in that the DSP 103 includes a detection circuit for detecting defective pixels in image data obtained from the image pickup device 101.

Figure 8:
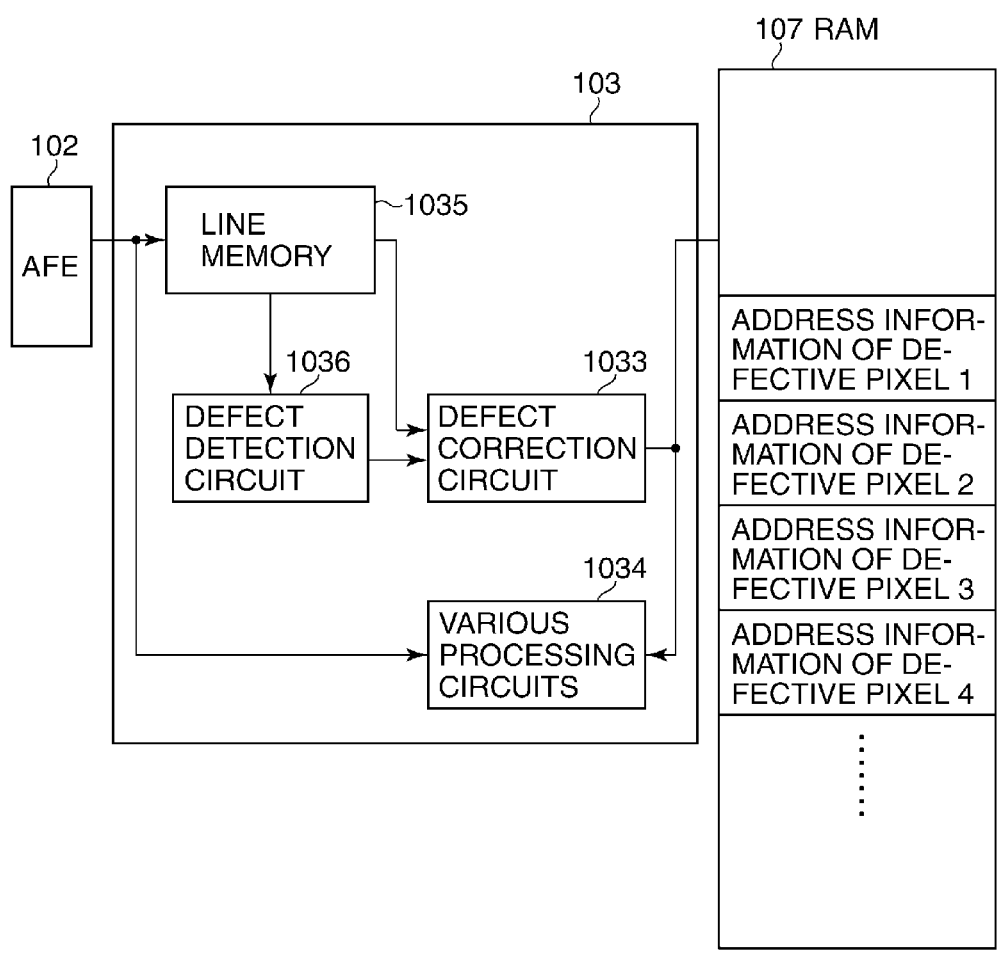
FIG. 8 is a block diagram of a DSP in an image pickup apparatus including an image processor according to a third embodiment of the present invention.

FIG. 8 is a block diagram of the DSP of the image pickup apparatus according to the third embodiment.

Referring to FIGS. 1 and 8, the DSP 103 includes the defect correction circuit 1033 and the various processing circuits 1034 as well as a line memory 1035 and a defect detection circuit 1036. The line memory 1035 temporarily stores image data output from the AFE 102. For each operation clock of the AFE 102, image data associated with a plurality of specific addresses is read out from the line memory 1035. This makes it possible to simultaneously read out pixels to which attention is paid and a plurality of pixels of the same color around the pixels to which attention is paid.

Figure 9:
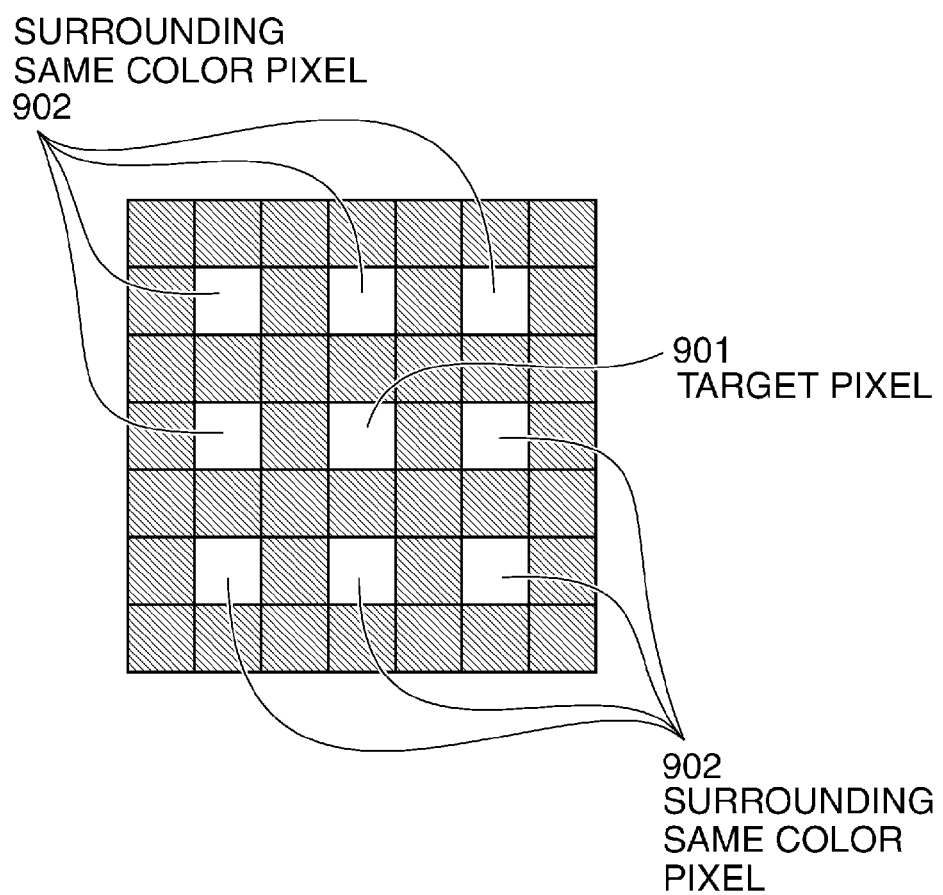
FIG. 9 is a view useful in explaining an example of reading of pixel data from a line memory appearing in FIG. 8.

FIG. 9 is a view useful in explaining reading of pixel data in the line memory 1035 appearing in FIG. 8.

In FIG. 9, now, it is assumed that data of a target pixel (a pixel to which attention is paid) 901 in the center and eight pixel data items (also simply referred to as the pixels) 902 of the same color around the target pixel data 901 are simultaneously read out. As a simple example, when a value of the target pixel data 901 has a difference from the average value of the eight pixel data items, which is not smaller than a preset value (defect reference level) set in a reference level-setting register (not shown) provided in the DSP 103 (difference not lower than the defect reference level), it is determined that the target pixel data 901 is unusual pixel data and hence a defective pixel.

Although the algorithm for detecting a defective pixel includes various types of algorithms, in the present embodiment, it is assumed here that when the difference between outputs from the target pixel 901 and the line memory 1035 exceeds the preset value set in the reference level-setting register, the defect detection circuit 1036 determines that the target pixel 901 is a defective pixel. Then, upon determining that the target pixel 901 is a defective pixel, the defect detection circuit 1036 sends the address information of the target pixel 901 to the defect correction circuit 1033.

The defect correction circuit 1033 compares the address information (having being converted to timing data similarly to the first embodiment) with the timing of the pixel data output from the line memory 1035, and when the target pixel 901 is output from the line memory 1035, the defect correction circuit 1033 performs the correction processing on the target pixel 901.

Therefore, in the third embodiment, it is not necessary to store the defect correction data in the RAM 107.

The image pickup apparatus in the third embodiment performs the same operations as those described with reference to FIGS. 2 and 3, but some of processing operations of the shooting process and the multi-exposure shooting are different from the shooting process described with reference to FIG. 4 and the multi-exposure shooting process described with reference to FIG. 6.

Figure 10:
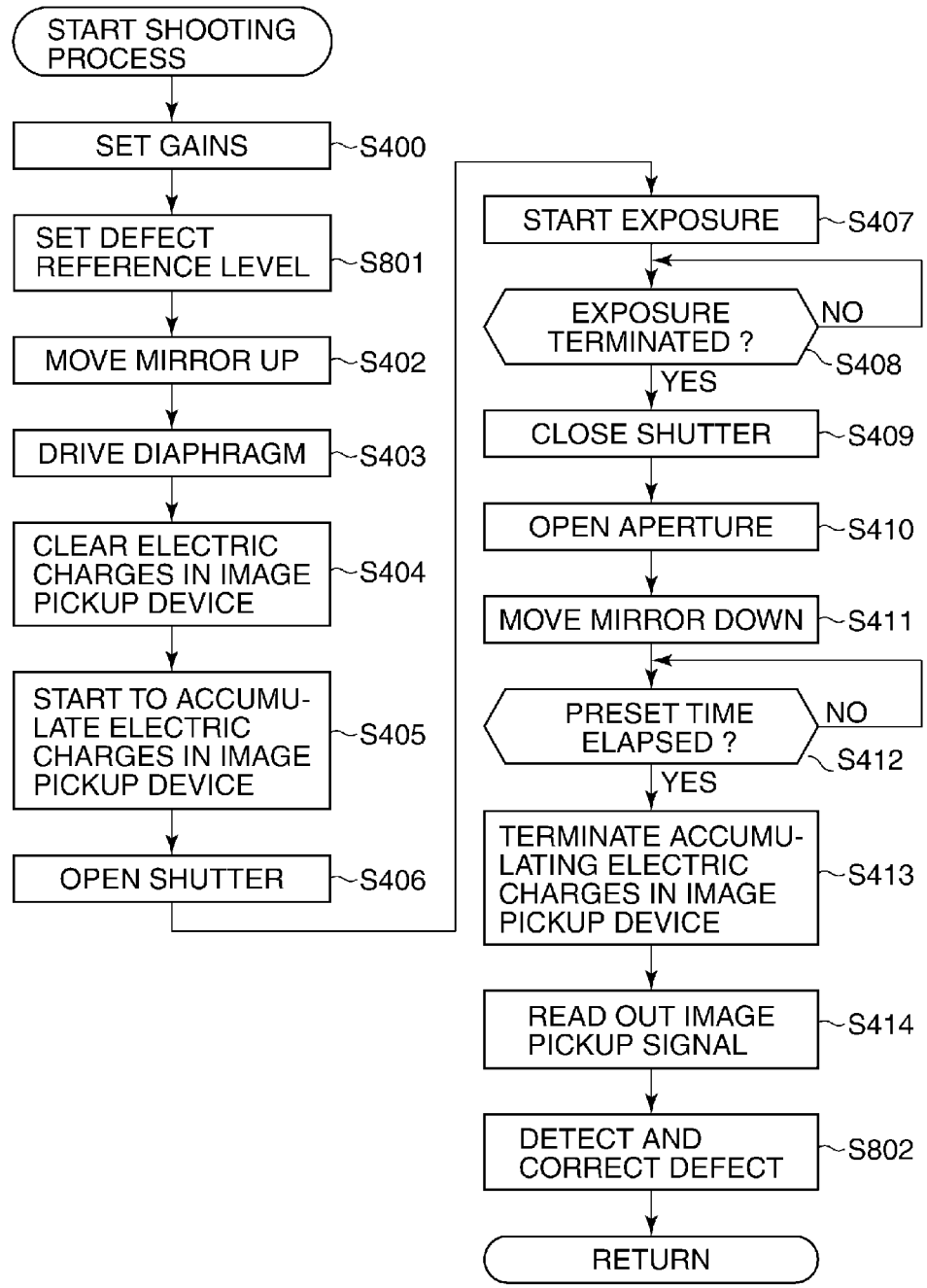
FIG. 10 is a flowchart of a shooting process executed by the image pickup apparatus including the image processor according to the third embodiment.

FIG. 10 is a flowchart of the shooting process executed by the image pickup apparatus including the image processor according to the third embodiment. The same steps in FIG. 10 as in the shooting process described with reference to FIG. 4 are denoted by the same reference numerals, and description thereof is omitted.

Referring to FIGS. 1 and 10, after performing setting of gains described with reference to FIG. 4 (step S400), the CPU 105 sets the reference level of defective pixels to be detected in the reference level-setting register provided in the DSP 103, instead of selecting the defect correction data (step S801).

Thereafter, the steps S402 to S414 described with reference to FIG. 4 are executed. Then, the DSP 103 performs detection of defective pixels and processing for correcting the detected defective pixels on the image data obtained from the image pickup device 101 as described hereinabove (step S802).

In the present embodiment, if it is determined by the defect detection circuit 1036 that a target pixel is a pixel to be corrected (i.e. a defective pixel), the defect correction circuit 1033 replaces the defective pixel by a pixel of the same color immediately before the defective pixel and outputs the same, according to the timing of outputting the target pixel output from the line memory 1035. This makes it possible to extract unusual pixel data (i.e. defective pixel data) from the image data obtained as a result of shooting, and perform the correction processing on the extracted pixel data.

Figure 11:
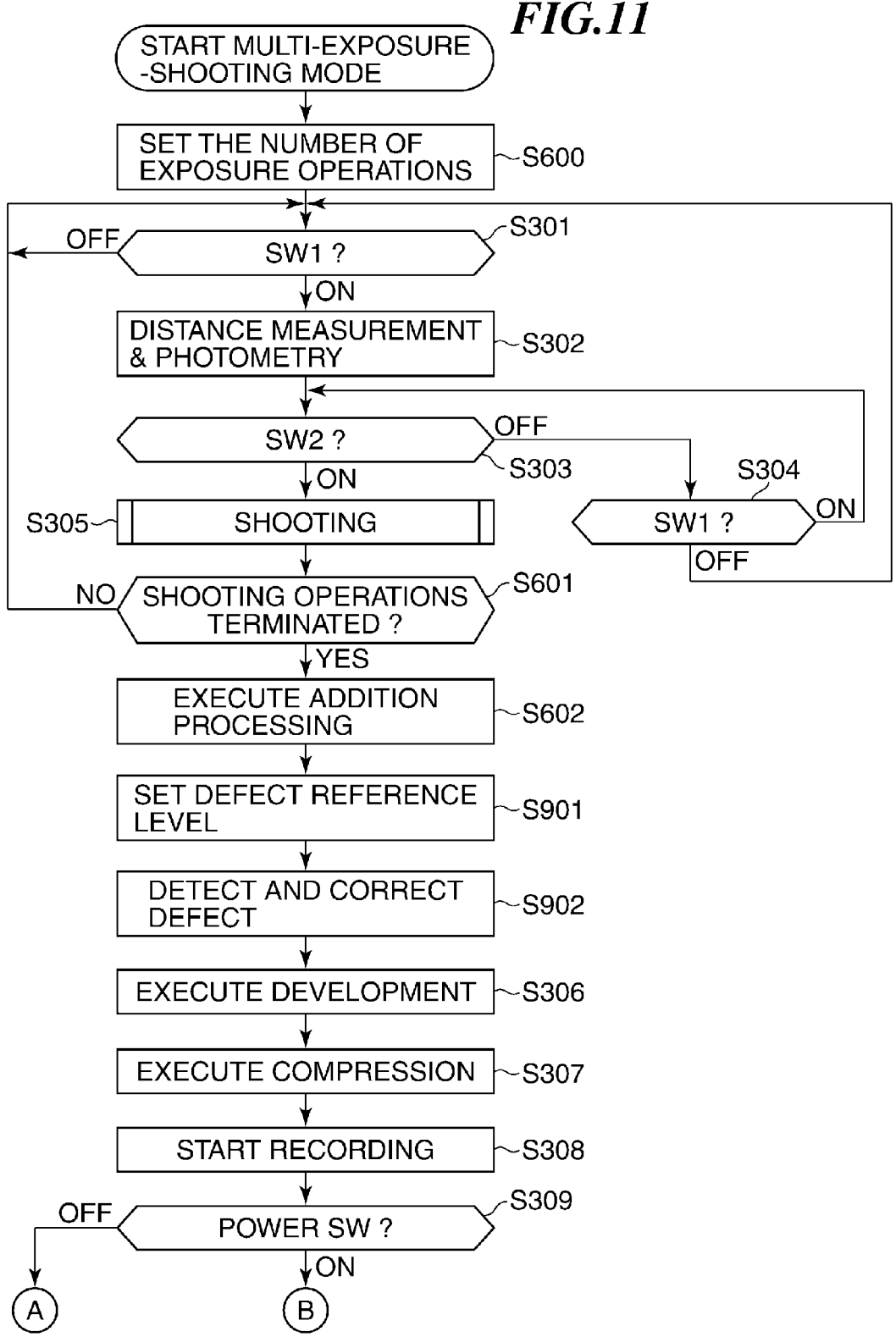
FIG. 11 is a flowchart of a multi-exposure shooting-mode shooting process executed by the image pickup apparatus in the third embodiment.

FIG. 11 is a flowchart of the multi-exposure shooting process executed by the image pickup apparatus in the third embodiment. The same steps in FIG. 11 as in the multi-exposure shooting described with reference to FIG. 6 are denoted by the same reference numerals, and description thereof is omitted.

Referring to FIGS. 1 and 11, when the shooting mode is shifted to the multi-exposure-shooting mode, the steps S600, S301 to S305, and S601 and S602, described with reference to FIG. 6, are executed. After performing the addition processing in the step S602, the CPU 105 sets the reference level of a defective pixel to be detected in the reference level-setting register (step S901).

Next, in the DSP 103, the detection of defective pixels and the correction of the detected defective pixels are performed as described above (step S902). Thereafter, the steps S306 to S309 described with reference to FIG. 6 are executed.

By the way, as for the setting of the defect reference level, it is considered that even when a plurality of image data items are subjected to addition processing, for example, if there is no change in gain processing after the addition processing and gamma correction processing in the development operation, the level of a visually noticeable defective pixel is not changed.

That is, if the detection of a defective pixel and the correction of the detected defective pixel are performed after the addition processing using the same reference level as that used in still image shooting, the defective pixel becomes difficult to be visually noticed during the addition processing. For example, considering a case where white defects not higher than the defect reference level exist in each of image data items of respective frames shot in multi-exposure shooting, if each image data item is separately subjected to development processing, there occurs no problem of the white defects being visually noticed (i.e. the defect reference level is set such that the white defects are not visually noticed).

On the other hand, when a plurality of image data items are subjected to the addition processing, minute white defects in each frame are cumulated, and the cumulated white defects in the multiply-exposed image each sometimes exceed the defect reference level. In this case, by detecting and correcting pixels exceeding the defect reference level, it is possible to correct the white defects having become visually noticeable by the addition processing.

Alternatively, while totally omitting frame-basis defective pixel detection and correction during the multi-exposure shooting, the detection and correction of defective pixels may be performed using the same defect reference level. In this case, however, the number of correction target pixels sometimes becomes very large, and hence it is necessary to perform detection and correction of defective pixels while taking into account the processing capability of the DSP 103.

Although in the above-described example, when the processing for correcting a defective pixel is performed, the defective pixel is replaced by pixel data of the same color immediately before the defective pixel, any other correction method may be applied. Further, although the multi-exposure-shooting mode is selected using the mode dial, the mode may be selected using any other suitable method.

As described above, in the third embodiment, it is possible to directly extract defective pixel data from image data obtained as a result of shooting and properly perform correction of the defective pixel data in the synthesized image data without using the defect correction data, and as a result, it is possible to prevent image quality of the synthesized image data from being degraded.

Next, a description will be given of an image pickup apparatus equipped with an image processor according to a fourth embodiment of the present invention. Note that the image pickup apparatus in the fourth embodiment has the same configuration as that of the image pickup apparatus described in the third embodiment, and hence description thereof is omitted.

Also in detecting defects from image data obtained as a result of shooting, image quality is degraded due to RTS noise. In multi-exposure shooting, when RTS noise is generated more than once at specific pixels, defective pixels can be detected and corrected using the method explained in the above-described third embodiment.

On the other hand, when RTS noise is once generated, it is difficult to detect RTS noise by the method explained in the third embodiment. Although the output values of RTS noise are very small when RTS noise is once generated, if the number of exposure operations in multi-exposure shooting is large in high ISO sensitivity shooting, minute defects are generated all over the data obtained as a result of multi-exposure shooting. Even if individual bright points (defects) are not noticeable, degradation of image quality as a whole is inevitable.

The image pickup apparatus equipped with the image processor according to the fourth embodiment executes substantially the same processes as those executed by the image pickup apparatus described in the third embodiment, and hence different points from those in the third embodiment will be described.

In the image pickup apparatus in the fourth embodiment, the value of the defect reference level set in the step S901 described with reference to FIG. 11 is changed. Further, the detection of defective pixels in the step S902 described with reference to FIG. 11 is changed.

In the image pickup apparatus in the fourth embodiment, to detect a single occurrence of RTS noise in the step S901, the setting of the defect reference level is changed to a value lower than that for determining a noticeable white defect. Then, in the step S902, an evaluation area and an evaluation method of surrounding pixels are changed. When RTS noise is taken into account, it is also necessary to take into account adverse influence of RTS noise in the area of surrounding pixels of the same color used as a reference of determination of defective pixels.

Figure 12:
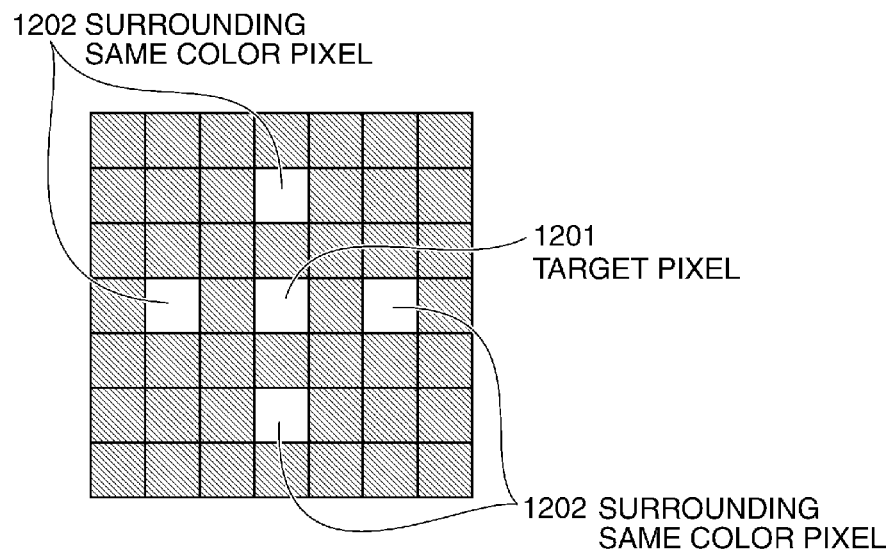
FIG. 12 is a view useful in explaining reading of pixel data from the line memory, appearing in FIG. 8, of an image pickup apparatus including an image processor according to a fourth embodiment of the present invention.

FIG. 12 is a view useful in explaining reading of pixel data by the line memory 1035 appearing in FIG. 8 of the image pickup apparatus equipped with the image processor according to the fourth embodiment.

In FIG. 12, now, let it be assumed that target pixel data 1201 in the center and four pixel data items 1202 of the same color around the target pixel data 1201 are simultaneously read out.

When compared with FIG. 9, the surrounding same color pixels read out simultaneously with the target pixel 1201 are reduced to half, i.e. four. This reduces the adverse influence of RTS noise which is generated in the surrounding same color pixels after the addition processing.

However, the surrounding same color pixels to be read out are simply reduced, and an averaged value of values of these pixels or the like is calculated, this reduces the accuracy in the pixel value. To overcome this problem, a median value in the surrounding same color pixels is calculated by way of a simple example to make it difficult to be affected by fluctuation in random noise, whereby the accuracy in the pixel value is maintained.

By doing this, if defective pixels are detected again using the low reference level at which even a small defect can be detected and the correction of the defective pixels is performed after the addition processing, it is possible to prevent image quality from being degraded due to a large number of minute defects generated by the adverse influence of RTS noise.

Further, by changing the number of surrounding same color pixels and using the median value as mentioned above, it is possible to properly determine minute defects generated by RTS noise, and as a result, it is possible to prevent image quality from being degraded.

Although in the fourth embodiment, the number of surrounding same color pixels is changed and the median value is used, any other suitable method can may be used insofar as it can detect the adverse influence of RTS noise.

As described above, in the fourth embodiment, the defective pixel data affected by RTS noise is extracted from the image data obtained as a result of shooting, and the defective pixel data generated by RTS noise in the synthesized image data is positively corrected without using the defect correction data, whereby it is possible to prevent image quality of the synthesized image data from being degraded.

Next, a description will be given of an example of an image pickup apparatus using an image processor according to a fifth embodiment of the present invention. Note that the image pickup apparatus in the fifth embodiment has the same configuration as that shown in FIG. 1, and hence description thereof is omitted.

In the above-described first to fourth embodiments, the description has been given of the case where in multi-exposure shooting, the image pickup apparatus performs shooting of a plurality of image frames and processing for adding the image data items of these frames is performed. In the present embodiment, for example, a description will be given of a case where a user selects desired image data items from the shot image data on a reproduction screen, and processing for adding the selected image data is performed. Note that a case where processing for adding so-called RAW data items before development processing, as the image data, is performed will be described.

Figure 13:
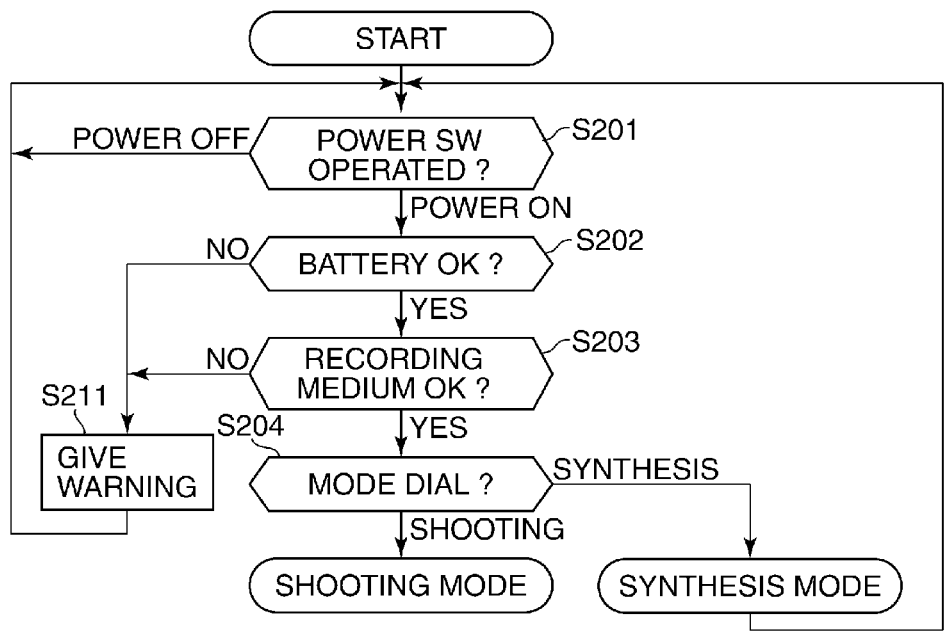
FIG. 13 is a flowchart of a startup and shooting process executed by an image pickup apparatus including an image processor according to a fifth embodiment of the present invention.

FIG. 13 is a flowchart of a startup and shooting process executed by an image pickup apparatus including an image processor according to a fifth embodiment. In FIG. 13, the same steps as shown in FIG. 2 are denoted by the same reference numerals and description thereof is omitted.

Referring to FIGS. 1 and 13, the CPU 105 monitors whether or not the power switch 109 is turned on in the step S201, and then executes the steps S202 to S204, and S211 as described hereinabove.

In the illustrated example, it is assumed that a shooting mode and a synthesis mode can be selected by the mode dial 112. Then, if the shooting mode is selected by the mode dial 112, the CPU 105 shifts the mode to the shooting mode. In this case, the CPU 105 controls the DSP 103 to display the mode selection on the LCD 114 to enable selection of one of the still image-shooting mode and the multi-exposure-shooting mode described with reference to FIG. 2. Then, the user operates the mode dial 112 again to select the still image-shooting mode or the multi-exposure-shooting mode.

On the other hand, if the synthesis mode is selected by the mode dial 112, the CPU 105 shifts the mode to the synthesis mode. Then, as described hereinafter, when the synthesis process is terminated, the CPU 105 returns to the step S201.

FIG. 14 is a flowchart of a synthesis-mode shooting process in the startup and shooting process shown in FIG. 13.

Referring to FIGS. 1 and 14, the user refers to reproduced images displayed on the LCD 114 to select a desired reproduced image by operating a console section (not shown). The CPU 105 monitors whether or not a first image is selected (step S1301), if the first image is not selected (NO to the step S1301), the CPU 105 waits.

On the other hand, if the first image is selected (YES to the step S1301), the CPU 105 monitors whether or not a second image is selected (step S1302). IF the second image is not selected (NO to the step S1302), the CPU 105 waits.

In this process, the synthesis processing is basically performed in units of two images, and when images more than two are to be synthesized, the process shown in FIG. 13 is repeatedly executed.

Next, the CPU 105 sets the defect reference level after the synthesis processing according to the two images selected by the user (step S1303). Here, it is assumed that the defect correction data has been recorded in advance as described in the first and second embodiments.

For example, the CPU 105 confirms camera ID information (identification information) accompanying (added to) the images (hereinafter also referred to as the image data), and obtains results of the determination. The camera ID information is for identifying the image pickup device 101 of the image pickup apparatus. Then, if it is determined from the determination result that the image data has been shot by the image pickup apparatus which is now executing the process, the CPU 105 uses the defect correction data stored in advance. On the other hand, if the image data has been shot by another image pickup apparatus, characteristics, such as the coordinates of each defective pixel, does not match, and hence it is determined that the defect correction data stored in advance cannot be used.

That is, if the camera ID information matches, the CPU 105 performs correction on the synthesized image data using the defect correction data stored in advance. On the other hand, if the camera ID information does not match, the CPU 105 sets the defect reference level to a very large value, so as not perform the correction processing.

Further, if the camera ID information matches, the CPU 105 determines whether or not the selected images have been shot according to the respective shooting conditions different from each other. Then, the CPU 105 obtains the defect reference levels set in the respective selected images according to the associated shooting conditions. The CPU 105 sets the defect reference level (pixel reference level) which is the lowest of all the defect reference levels thus obtained, as the reference value for determining defective pixels in the synthesized image.

Next, the CPU 105 controls the DSP 103 to perform processing for adding the two image data items (step S1304), detects defective pixels using the reference level (reference value) set in the step S1303, and performs the correction processing on the synthesized image (image having been subjected to the addition processing) as described hereinabove (step S1305).

Thereafter, the CPU 105 executes the steps S306 to S308 described with reference to FIG. 3, while controlling the DSP 103, followed by terminating the synthesis mode.

As described above, when image data items having been recorded are synthesized, the camera ID information of an image pickup apparatus which has shot the recorded image data is confirmed, and if the recorded image data has been shot by an image pickup apparatus which is different from the image pickup apparatus which performs the processing, the defect correction processing after synthesis is inhibited from being performed. This makes it possible to prevent erroneous correction in a case where the camera ID information does not match, and prevent image quality from being degraded due to the erroneous correction.

As is clear from the above description, in FIGS. 1, 5, and 8, the CPU 105 and the DSP 103 function as a synthesis unit, and the address comparison circuit 1032, the memory control circuit 1031, and the RAM 107 function as a first comparison unit and a second comparison unit. Further, the defect correction circuit 1033 functions as a first correction unit and a second correction unit.

Further, the CPU 105 functions as a setting unit, and the line memory 1035 and the defect detection circuit 1036 function as a defect determination unit. The CPU 105 further functions as a device determination unit and a condition determination unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the functions of the above-described embodiments may be converted to a control method, and the control method may be executed by an image processing apparatus. Further, a control program including the functions of the above-described embodiments may be executed by a computer provided in the image processing apparatus.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2010-242426, filed Oct. 28, 2010, which is hereby incorporated by reference herein in its entirety.

What is claimed is:

1. An image processor that processes image data obtained as a result of image pickup by an image pickup device to form processed image data, comprising:
    a synthesis unit configured to synthesize a plurality of image data items to form synthesized image data;
    a first comparison unit configured to compare a first reference value which is smaller than a second reference value for use in determining whether or not to correct each of pixel data items forming the image data, and a pixel value which is indicated by each of synthesized pixel data items forming the synthesized image data; and
    a first correction unit configured to perform first correction processing in which synthesized pixel data items of the synthesized image data are corrected according to a result of comparison by said first comparison unit to thereby form the processed image data.

2. The image processor according to claim 1, wherein if it is determined based on the result of comparison by said first comparison unit that a pixel data item is a defective pixel data item, said first correction unit replaces the defective pixel data item by a pixel data item of the same color positioned immediately before the defective pixel data item.

3. The image processor according to claim 1, further comprising:
    a second comparison unit configured to compare a pixel value indicated by each pixel data item of the image data and the second reference value; and
    a second correction unit configured to perform second correction processing in which pixel data items of the image data are corrected according to a result of comparison by said second comparison unit to thereby form corrected image data, and wherein said synthesis unit synthesizes a plurality of frames of the corrected image data to thereby form the synthesized image data.

4. The image processor according to claim 1, wherein the first reference value is determined according to ISO sensitivity and a shutter time.

5. The image processor according to claim 1, wherein in synthesizing n frames (n is an integer more than one) of image data to form the synthesized image data, the first reference value is set to be equal to 1/n times of the second reference value.

6. The image processor according to claim 3, further comprising a storage unit configured to store data associated with defective pixels of pixels generated by the image pickup device, as correction data, and
wherein said first and second correction units perform the first and second correction processing on the pixel data item associated with defective pixels indicated by the correction data.

7. The image processor according to claim 3, further comprising:
a setting unit configured to set a defect reference level for determining defect pixels of the pixel data; and
a defect determination unit configured to determine whether or not each of the pixel data items forming the image data is defective pixel data according to the defect reference level, and
wherein said first and second correction units perform the first and second correction processing on the defective pixel data.

8. The image processor according to claim 7, wherein if a difference between an averaged value of pixel values of surrounding pixel data items located in the vicinity of one pixel data item in the image data and a pixel value of the one pixel data item is not smaller than the defect reference level, said defect determination unit determines that the one pixel data item is the defective pixel data.

9. The image processor according to claim 7, wherein if a difference between a median value of pixel values of surrounding pixel data items located in the vicinity of one pixel data item in the image data and a pixel value of the one pixel data item is not lower than the defect reference level, said defect determination unit determines that the one pixel data item is the defective pixel data.

10. The image processor according to claim 1, wherein identification information for identifying the image pickup device is added to the image data,
the image processor further comprising a device determination unit configured to be operable when image data items are synthesized to form the synthesized image data by said synthesis unit, to determine according to the identification information whether or not the image data items have been obtained by image pickup devices which are different from each other, and
wherein said first correction unit determines whether or not to execute the first correction processing according to a result of determination by said device determination unit.

11. The image processor according to claim 10, wherein if the result of determination by said device determination unit indicates that the image data items have been obtained by image pickup devices which are different from each other, said first correction unit does not execute the first correction processing.

12. The image processor according to claim 10, wherein if the result of determination by said device determination unit indicates that all of the image data items have been obtained by an identical image pickup device, said first correction unit executes the first correction processing.

13. The image processor according to claim 12, further comprising a condition determination unit configured to be operable when the result of determination indicates that all of the image data items have been obtained by an identical image pickup device, to determine whether or not the image data items have been shot under different sets of shooting conditions, respectively, and
wherein said first correction unit sets a pixel reference level which is the lowest of all pixel reference levels for determining defective pixels of the image data as the first reference value.

14. A method for controlling an image processor that processes image data obtained as a result of image pickup by an image pickup device to form processed image data, comprising:
synthesizing a plurality of image data items to form synthesized image data;
comparing a first reference value which is smaller than a second reference value for use in determining whether or not to correct each of pixel data items forming the image data, and a pixel value which is indicated by each of synthesized pixel data items forming the synthesized image data; and
performing first correction processing in which synthesized pixel data items of the synthesized image data are corrected according to a result of comparison to thereby form the processed image data.

15. A non-transitory computer-readable storage medium storing a computer-executable program for causing a computer provided in the image processor to execute a method of controlling an image processor that processes image data obtained as a result of image pickup by an image pickup device to form processed image data,
wherein the method comprises:
synthesizing a plurality of image data items to form synthesized image data;
comparing a first reference value which is smaller than a second reference value for use in determining whether or not to correct each of pixel data items forming the image data, and a pixel value which is indicated by each of synthesized pixel data items forming the synthesized image data; and
performing first correction processing in which synthesized pixel data items of the synthesized image data are corrected according to a result of comparison to thereby form the processed image data.

* * * * *